(12) United States Patent
Shaw et al.

(10) Patent No.: US 7,809,030 B2
(45) Date of Patent: Oct. 5, 2010

(54) OPO MID-IR WAVELENGTH CONVERTER

(75) Inventors: Leslie Brandon Shaw, Woodbridge, VA (US); Jasbinder S. Sanghera, Ashburn, VA (US); Ishwar D. Aggarwal, Fairfax Station, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/409,799

(22) Filed: Mar. 24, 2009

(65) Prior Publication Data

US 2010/0080252 A1  Apr. 1, 2010

Related U.S. Application Data

(60) Provisional application No. 61/101,751, filed on Oct. 1, 2008.

(51) Int. Cl.
*H01S 3/10* (2006.01)
(52) U.S. Cl. .............. 372/22; 372/6; 372/4; 372/21
(58) Field of Classification Search ............ 372/6, 372/21–22
See application file for complete search history.

(56) References Cited

U.S. PATENT DOCUMENTS

| 5,384,884 | A | 1/1995 | Kashyap et al. |
| 5,563,730 | A * | 10/1996 | Singh et al. ............ 359/321 |
| 5,878,067 | A | 3/1999 | Egawa |
| 6,324,326 | B1 | 11/2001 | Dejineka et al. |
| 6,928,227 | B2 | 8/2005 | Shaw et al. |
| 7,327,928 | B2 * | 2/2008 | Shaw et al. ............ 385/142 |
| 2006/0132901 | A1 | 6/2006 | Miller |
| 2008/0055714 | A1 | 3/2008 | Miller |

OTHER PUBLICATIONS

S. D. Jackson et al., "Chalcogenide glass Raman Fiber Laser," Appl. Phys. Lett., vol. 88 (2006) 88.
P. Thielen et al., "Small core As-Se Fiber for Raman Amplification," Optics Letters 28 [16] (2003) 1406-1408.
International Search report and Written Opinion in PCT Application No. PCT/US2009/066086.
Charles Kittel, Introduction to Solid State Physics, 8th ed., pp. 3, 567, 573 (2005).
William D. Callister, Materials Science and Engineering: An Introduction, 7th Ed., pp. 39, 71, 471 (2007).
Amar R. Bhagwat et al., "Nonlinear optics in hollow-core photonic bandgap fibers," Optics Express,. vol. 16, No. 7, pp. 5035-5047 (2008).

* cited by examiner

*Primary Examiner*—Dung T Nguyen
(74) *Attorney, Agent, or Firm*—Amy Ressing; Joslyn Barritt

(57) ABSTRACT

A wavelength converter comprising an arsenic sulfide (As—S) chalcogenide glass fiber coupled to an optical parametric oscillator (OPO) crystal and a laser system using an OPO crystal coupled to an As—S fiber are provided. The OPO receives pump laser radiation from a pump laser and emits laser radiation at a wavelength that is longer than the pump laser radiation. The laser radiation that is emitted from the OPO is input into the As—S fiber, which in turn converts the input wavelength from the OPO to a desired wavelength, for example, a wavelength beyond about 4.4 μm. In an exemplary embodiment, the OPO comprises a periodically poled lithium niobate (PPLN) crystal. The As—S fiber can include any suitable type of optical fiber, such as a conventional core clad fiber, a photonic crystal fiber, or a microstructured fiber.

8 Claims, 6 Drawing Sheets

# OPO MID-IR WAVELENGTH CONVERTER

CROSS-REFERENCE

This application claims the benefit of priority based on U.S. Provisional Patent Application No. 61/101,751 filed on Oct. 10, 2008, the entirety of which is hereby incorporated by reference into the present application.

TECHNICAL FIELD

The present invention relates to wavelength converters for use in infrared lasers.

BACKGROUND

Lasers transmitting in the infrared (IR) portion of the electromagnetic spectrum have become very important in recent years. Of particular importance are lasers transmitting in the mid-IR range, comprising wavelengths between 3 and 5 µm. In this range, two atmospheric transmission bands exist, which are very useful for applications such as Light Detection and Ranging (LIDAR) systems, chemical sensing, free-space communications and IR countermeasures (IRCM). The first of these bands lies between about 3 and about 4.2 µm, while the second band lies between about 4.4 and 5.2 µm. The bands are separated by an atmospheric $CO_2$ absorption peak which has high attenuation at about 4.3 µm.

Lasers which can transmit in these two bands are limited. The majority of such lasers are based on solid state or fiber pump lasers in the near-IR range between 1 and 2 µm and use an Optical Parametric Oscillator (OPO) crystal to convert the 1 to 2 µm pump into the longer 3 to 5 µm wavelengths by a nonlinear interaction in the crystal.

Periodically Poled Lithium Niobate (PPLN) is a highly nonlinear material which is very useful as an OPO for converting a near-IR laser pump to the mid-IR. Due to the very high nonlinearity of PPLN and the ability to achieve desired phase matching by periodically poling the material, laser/OPO systems based upon PPLN have very high wavelength conversion efficiencies. PPLN based systems also can be pumped by commercial continuous wave (CW) lasers rather than by the high-peak-power pulsed lasers typically used with OPO materials.

Unfortunately, laser/OPO systems based upon PPLN can only produce output having wavelengths up to about 4 µm due to absorption of higher-wavelength radiation in the PPLN crystal. Extending PPLN-based sources to the second atmospheric transmission band beyond 4.4 µm would be highly useful for the applications noted above such as LIDAR, chemical sensing, free-space communications, and IRCM, as well as many others.

The output from a PPLN can in turn be wavelength-converted to higher wavelengths, for example, by using an appropriate glass fiber to shift the wavelength the PPLN output before it is transmitted as the final output of the laser.

The magnitude of the wavelength shift in the radiation emitted by the glass fiber is based on the "phonon energy" of the fiber, having units of $cm^{-1}$. The energy of the radiation, both pump and shifted wavelength, is inversely related to its wavelength, i.e., $$E = \frac{hc}{\lambda},$$

where h is Planck's constant, c is the speed of light, and λ is the wavelength of the radiation. Thus the change in wavelength λ between the pump and emitted radiation corresponds to the phonon energy of the glass and is often called the "Raman shift" or "Stokes shift," and the thus-shifted wavelength emitted by the fiber is often called the "Stokes wavelength."

Chalcogenide fiber Raman lasers and amplifiers can operate in the mid-IR range. For example, U.S. Pat. No. 6,928,227 to Shaw et al., which shares inventors in common with the present invention and is hereby incorporated by reference into the presents disclosure, describes a Raman laser and amplifier based upon arsenic selenide (As—Se) glass fiber. Raman amplification and lasers using As—Se fiber also is described in P. Thielen et al., "Small core As—Se Fiber for Raman Amplification," *Optics Letters* 28 [16] (2003) 1406-1408 and in S. D. Jackson et al., "Chalcogenide glass Raman Fiber Laser," *Appl. Phys. Lett., Vol.* 88 (2006) 88. In the case of As—Se glass, the phonon energy of the glass is on the order of about 260 $cm^{-1}$. The wavelength shift in this glass will correspond to this phonon energy. For example, for a pump having a wavelength of about 1.5 µm, the wavelength shift will be about 0.06 µm.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

Features described and claimed in the present disclosure described invention include a wavelength converter comprising an arsenic sulfide (As—S) chalcogenide glass fiber coupled to an optical parametric oscillator (OPO) crystal and a laser system using an OPO crystal coupled to an As—S fiber. The OPO receives pump laser radiation from a pump laser and emits laser radiation at a wavelength that is longer than the pump laser radiation. The laser radiation that is emitted from the OPO is input into the As—S fiber, which in turn converts the input wavelength from the OPO to a desired wavelength, for example, a wavelength beyond about 4.4 µm. In an exemplary embodiment, the OPO comprises a periodically poled lithium niobate (PPLN) crystal. The As—S fiber can include any suitable type of optical fiber, such as a conventional core clad fiber, a photonic crystal fiber, or a microstructured fiber.

DETAILED DESCRIPTION

The aspects and features summarized above can be embodied in various forms. The following description shows, by way of illustration, combinations and configurations in which the aspects can be practiced. It is understood that the described aspects and/or embodiments are merely examples. It is also understood that one skilled in the art may utilize other aspects and/or embodiments or make structural and functional modifications without departing from the scope of the present disclosure.

For example, exemplary embodiments of a laser system described below may include a continuous wave laser and an optical parametric crystal (OPO) comprising periodically poled lithium niobate (PPLN). However, it will be noted by one skilled in the art that other forms of laser and other OPO crystals can also be used within the scope of the present invention so long as they emit laser radiation in the appropriate wavelength ranges in the near- and mid-infrared.

As noted above, the output from an OPO can in turn be wavelength-converted to higher wavelengths by using an appropriate glass fiber to receive the OPO output before it is transmitted as the final output of the laser.

Figure 1:
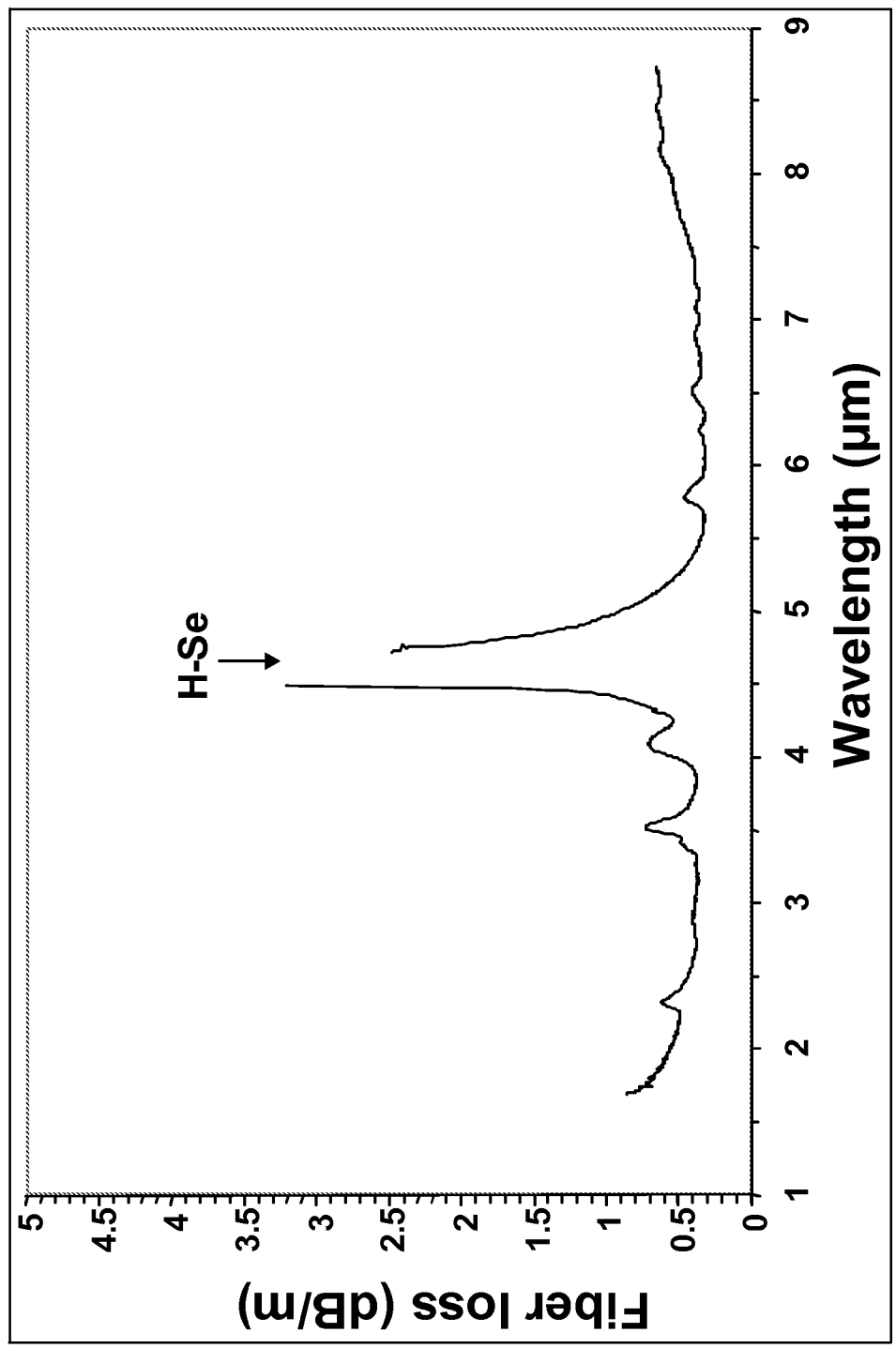
FIG. 1 depicts a plot of the absorption spectrum of arsenic selenide (As—Se) fiber as a function of wavelength.

One glass that has been used in such fibers is arsenic selenide (As—Se) chalcogenide glass. For wavelength conversion from an OPO source to wavelength greater than 4.4 µm, however, As—Se fiber is not viable as a Raman converter. As seen in FIG. 1, As—Se fiber exhibits very high absorption in the wavelength range of from about 4.4 to about 5 µm due to hydrogen selenide (H—Se) impurity absorption, making it unsuitable for wavelength conversion in the desired range above about 4.4 µm.

In contrast, fibers comprising arsenic sulfide (As—S) chalcogenide glasses have no absorption in this wavelength range. Thus, an As—S fiber is ideal for use as a wavelength converter to achieve a final laser emission in the second band beyond about 4.4 µm.

Figure 2:
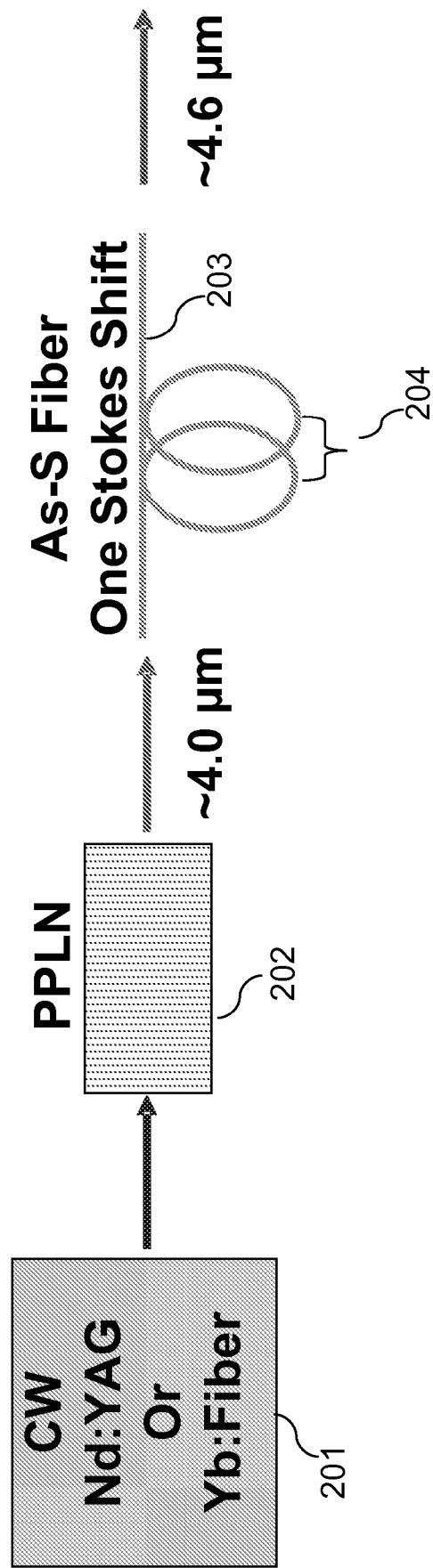
FIG. 2 is a block diagram depicting an exemplary embodiment of a laser system having a PPLN/OPO As—S fiber wavelength converter according to the present invention.
Figure 3:
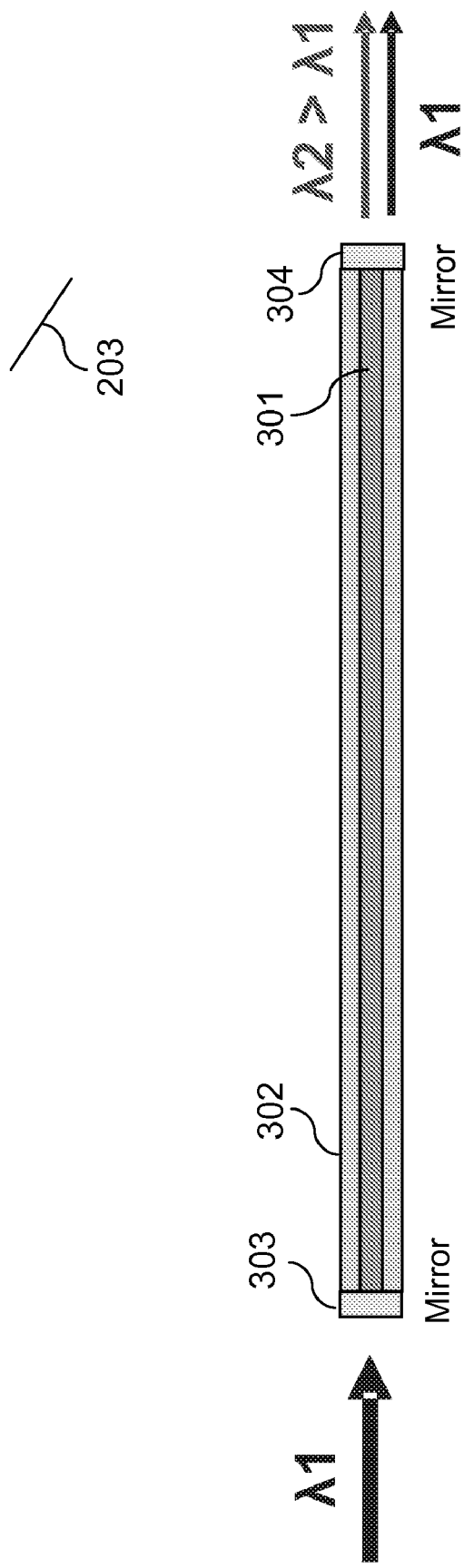
FIG. 3 is a block diagram depicting aspects of an exemplary embodiment of an As—S fiber wavelength converter according to the present invention.

FIGS. 2 and 3 are block diagrams depicting aspects of an exemplary embodiment of a laser system using a PPLN and an As—S glass fiber in accordance with the present invention. As pictured in FIG. 2, the system can include a continuous wave (CW) pump laser 201, a PPLN crystal 202, and an arsenic selenide (As—S) fiber 203. As described in more detail below, the As—S fiber can convert the PPLN output, which is in the range of about 2 to 4 µm, to output in the range of about 3 to 5 µm.

In some embodiments, pump laser 201 can use a neodymium-doped yttrium aluminum garnet (Nd:YAG) or crystal or an ytterbium (Yb) laser fiber as a laser material. In other embodiments, neodymium-doped yttrium orthovandanate (Nd:YVO$_4$) laser crystals or any other suitable rare-earth doped solid state or fiber laser material such as ytterbium (Yb) doped fiber, erbium (Er) doped fiber, or thulium (Tm) doped fiber can be used, and all such embodiments are within the scope of this disclosure. Note that the laser can be either CW or pulsed. For pulsed laser, there may or may not be a need for the fiber to be in an optical cavity formed by two mirrors or reflectors.

The pump laser is coupled to PPLN crystal 202 which is situated inside an oscillator formed by two or more mirrors. As described above, as a laser emission from pump laser 201 travels through PPLN 202, its wavelength increases due to the non-linear optical properties of the PPLN. For example, PPLN 202 can take an input from pump laser at a first wavelength in the near-IR range, i.e., having a wavelength of about 1 to 2 µm, and can emit at a second wavelength in the mid-IR range, with idler wavelengths between 2 and 4 µm, depending on the exact pump wavelength, crystal temperature, and poling period of the PPLN crystal.

The idler emission of PPLN 202 is coupled to an As—S based chalcogenide fiber 203 by a coupling means (not shown). The coupling means can include one or more mirrors or lenses, or can include any other appropriate means to match the mode size and divergence of the output of the PPLN laser to the mode size and numerical aperture (NA) of the fiber. An As—S fiber suitable for use in the present invention can be configured as a conventional core clad fiber, a photonic crystal fiber, a microstructured fiber, or any other kind of optical glass fiber capable of transmitting electromagnetic waves having the desired wavelengths. For example, in the exemplary embodiment shown in FIG. 3, As—S fiber 203 comprises a conventional core clad fiber having an inner core 301 and an outer cladding 302, but as noted above fibers having other appropriate dimensions and configurations as well as special fiber structures such as tapered fiber structures can be used.

As shown in FIG. 3, in some embodiments, the laser cavity is formed by a cavity having two mirrors 303 and 304 on the opposite ends thereof. In alternative embodiments, the laser cavity can be formed in the As—S-based fiber itself by mirrors deposited on the end face of the fiber or by Bragg gratings formed in the fiber. The input mirror 303 will have high transmittance at the PPLN idler wavelength $\lambda 1$ and high reflectivity at the first Stokes wavelength $\lambda 2$ defined by the Stokes shift 204 of the fiber shown in FIG. 2 and as described above. Output mirror 304 can have a partial transmittance at the first Stokes wavelength $\lambda 2$ of the fiber and in some embodiments can have either a high transmittance at the PPLN idler wavelength $\lambda 1$ or a partial or full reflectivity at the PPLN idler wavelength. Thus, in some embodiments, output mirror 304 can transmit at both the input idler wavelength $\lambda 1$ and the longer Stokes wavelength $\lambda 2$. Note that in some embodiments, for example with short pulse OPO pump lasers, no mirrors 303 or 304 are needed.

For example, if the Stokes shift of an As—S fiber is ~350 $cm^{-1}$, an idler emission from PPLN 202 at a wavelength of 4 µm that is input into As—S fiber 203 will be output by As—S fiber 203 as the final output of the laser system after being shifted to a wavelength of ~4.65 µm by one Stokes shift in the fiber. By tuning the wavelength of the output of the PPLN in the first atmospheric transmission band, the wavelength of the final output of the laser system through the As—S fiber in the second atmospheric transmission band can be controlled.

In addition, more than one Stokes shift is possible. For example, the cavity could be resonant at the first and second Stokes wavelengths with partial transmission at the second Stokes wavelength at the output coupler.

Alternatively, wavelength conversion can be accomplished by single pass or double pass of the PPLN emission through As—S fiber 203. In this case, pump laser power, fiber core size, and fiber length can be chosen to achieve the required conversion to the longer wavelength. Multiple shifts can be accomplished if desired.

In addition, in other embodiments, As—S fiber 203 can also be used as an amplifier. In such embodiments, PPLN 202 can act as a pump, and a signal in the second transmission window can be mixed with the pump in the fiber. The PPLN emission would amplify the signal in the fiber. The source of the signal in such an embodiment could be, for example, a quantum cascade laser diode.

Aspects of the invention will now be further described with respect to the following Examples.

Example 1

Figure 4:
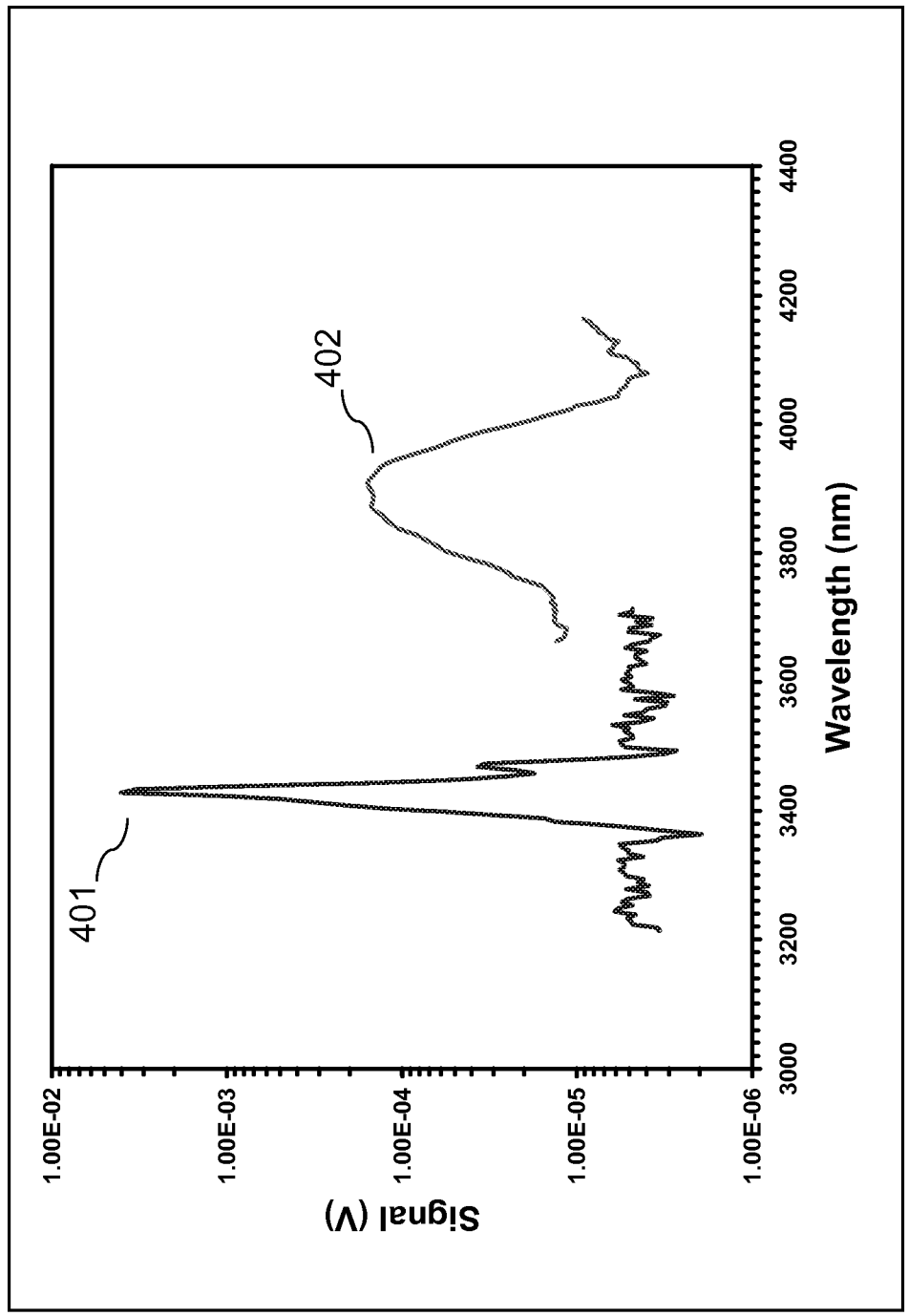
FIG. 4 depicts plots of a signal transmission spectrum for a 3.45 µm wavelength pump that has been Raman-shifted to 3.85 µm using an As—S fiber wavelength converter according to the present invention.

An Acculight pulsed PPLN laser was used to pump a 1 meter length of small core As—S fiber having a core diameter of 6 µm. 200 mW of emission from the PPLN at an idler wavelength of 3.3 µm was launched into the fiber. The idler wavelength was Stokes-shifted to 3.85 µm and output from the fiber. The Stokes-shifted radiation was monitored on the output end of the fiber using a monochromator and InSb detector. FIG. 4 shows the wavelength spectrum of the pump radiation 401 and the first Stokes-shifted radiation 402.

Example 2

Figure 5:
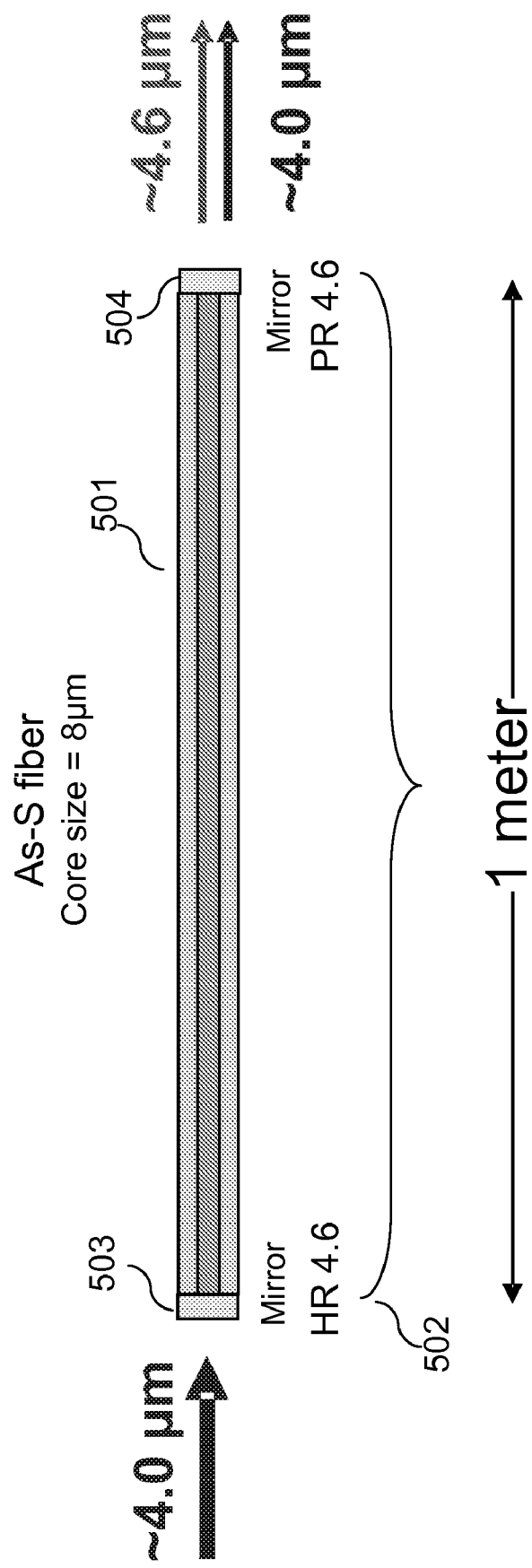
FIG. 5 is a block diagram depicting aspects of another exemplary embodiment of an As—S fiber wavelength converter according to the present invention.
Figure 6:
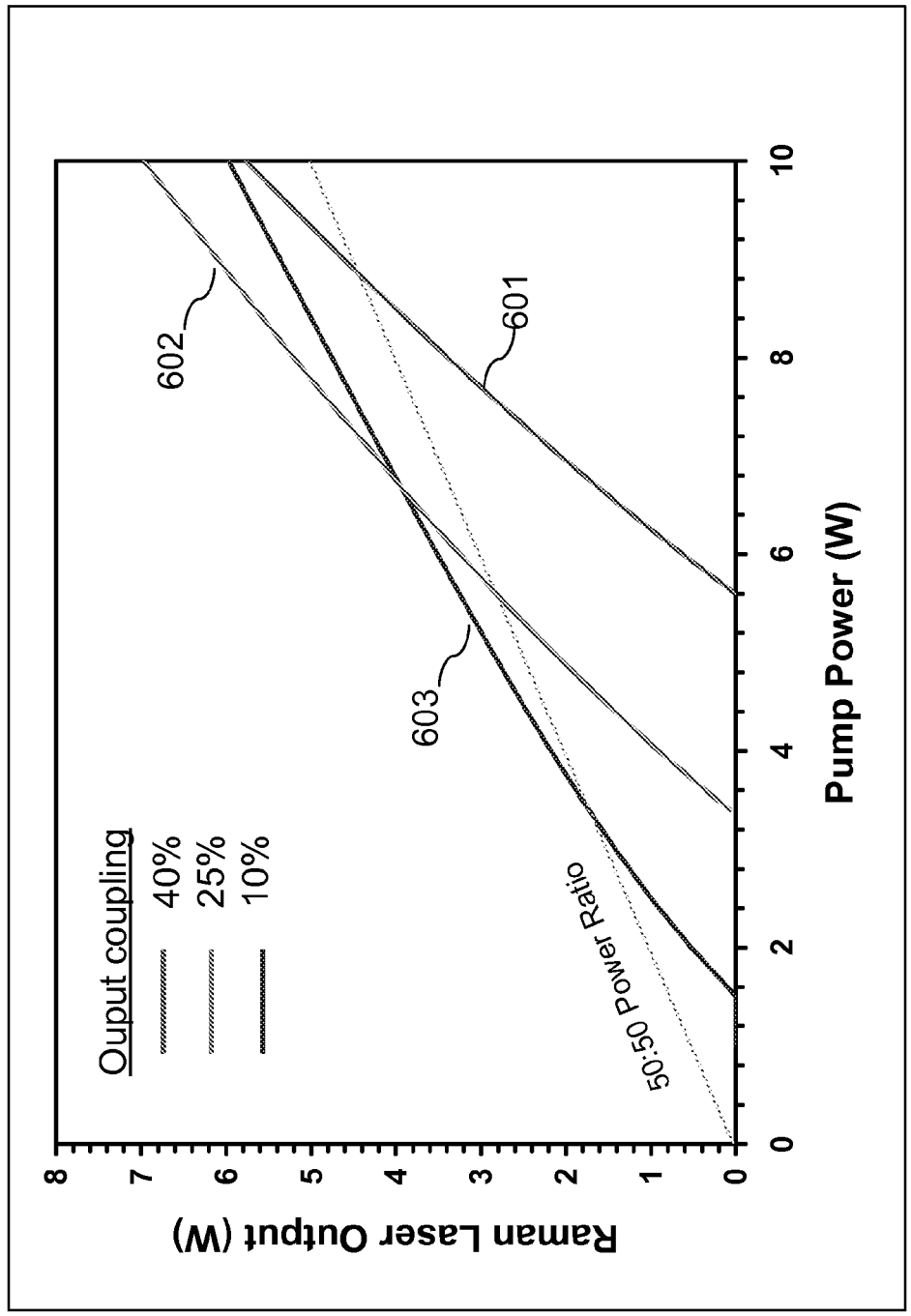
FIG. 6 depicts plots of pump power vs. Raman laser output for various transmissions from an output coupling mirror for an exemplary PPLN/OPO Raman laser using an As—S fiber wavelength converter according to the present invention.

In this example, a PPLN OPO was pumped at 1.064 µm by a Nd:YAG laser and emitted with an idler wavelength of ~4.0 µm. The idler laser emission was coupled into an As—S single mode fiber 501 shown in FIG. 5, which is placed in a cavity 502 comprising two mirrors 503 and 504 at opposite ends thereof. In this embodiment, the fiber 501 is 1 meter long, with a core diameter of 8 µm. The input mirror 503 has a high transmission at ~4.0 µm and >99% reflectivity at ~4.6 µm. The output mirror 504 has high transmission at ~4.0 µm and partial transmission at ~4.6 µm. The idler laser emission resonates in the cavity 502 formed by the two mirrors and the As—S fiber and is shifted by one Stokes shift to ~4.6 µm. Numerical aperture (NA) is 0.4, while the signal loss of the output radiation is 0.1 dB/m. FIG. 6 shows the modeled laser output vs. pump and output coupling. Lines 601, 602, and 603 show the output power vs. input pump power when mirror 504 has a transmission at the Stokes wavelength (~4.6 µm) of 10%, 25% and 40% respectively.

Advantages and New Features

This device greatly extends the usefulness of OPO laser systems to wavelengths beyond 4 µm. Since OPO laser systems are typically very compact and pumpable by CW lasers, Raman wavelength conversion will enable compact lasers beyond 4 µm which is not possible for existing OPO PPLN systems.

Although particular embodiments, aspects, and features have been described and illustrated, it should be noted that the invention described herein is not limited to only those embodiments, aspects, and features. It should be readily appreciated that modifications may be made by persons skilled in the art, and the present application contemplates any and all modifications within the spirit and scope of the underlying invention described and claimed herein.

What is claimed is:

1. A wavelength converter for a laser system, comprising:
   a solid core clad arsenic sulfide (As—S) glass fiber operatively coupled to an optical parametric oscillator (OPO) crystal;
   wherein the solid core clad As—S glass fiber is configured to receive first laser radiation from the OPO at a first wavelength, the first wavelength being an idler wavelength of the OPO, and to emit second laser radiation at a second wavelength, the second wavelength being longer than the first wavelength, a difference between the first and second wavelengths corresponding to a Stokes shift associated with the solid core clad As—S glass fiber.

2. The wavelength converter according to claim 1, wherein at least one end of the As—S glass fiber has a tapered structure.

3. The wavelength converter according to claim 1, wherein the first and second laser radiation comprise radiation having a wavelength in the mid-infrared range.

4. The wavelength converter according to claim 1, wherein the first laser radiation comprises radiation having a wavelength between about 2 µm and about 4 µm, and the second laser radiation comprises radiation having a wavelength between about 3 µm and about 5 µm.

5. The wavelength converter according to claim 1, wherein the As—S glass fiber is situated in a laser cavity comprising an input mirror and an output mirror, the input mirror of the laser cavity being at a first end of the As—S glass fiber and the output mirror of the laser cavity being at a second end of the As—S glass fiber; and
   further wherein the input mirror has a high transmittance at the first wavelength and a high reflectance at the second wavelength and the output mirror has at least a partial transmittance at the second wavelength.

6. The wavelength converter according to claim 5, wherein the output mirror has at least a partial transmittance of the first wavelength so that the second laser radiation comprises both the first and second wavelengths.

7. The wavelength converter according to claim 1, wherein the As—S glass fiber comprises a laser cavity formed by a plurality of Bragg gratings in the As—S glass fiber; and
   further wherein the first laser radiation at the first wavelength is converted to the second laser radiation at the second wavelength due to interaction of the first laser radiation with the Bragg gratings in the As—S glass fiber.

8. The wavelength converter according to claim 1, wherein the OPO crystal comprises a periodically poled lithium niobate (PPLN) crystal.

* * * * *